US012339548B2

(12) United States Patent
Oikawa

(10) Patent No.: US 12,339,548 B2
(45) Date of Patent: Jun. 24, 2025

(54) ELECTRO-OPTICAL DEVICE AND ELECTRONIC DEVICE

(71) Applicant: SEIKO EPSON CORPORATION, Tokyo (JP)

(72) Inventor: Hiroyuki Oikawa, Chitose (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/810,543

(22) Filed: Aug. 21, 2024

(65) Prior Publication Data

US 2025/0068018 A1 Feb. 27, 2025

(30) Foreign Application Priority Data

Aug. 22, 2023 (JP) ................................ 2023-134867

(51) Int. Cl.
*G02F 1/1362* (2006.01)
*G02F 1/1368* (2006.01)
*H04N 9/31* (2006.01)

(52) U.S. Cl.
CPC .. *G02F 1/136209* (2013.01); *G02F 1/136286* (2013.01); *G02F 1/1368* (2013.01); *H04N 9/312* (2013.01)

(58) Field of Classification Search
CPC ..................... G02F 1/136209; G02F 1/136286
See application file for complete search history.

(56) References Cited

U.S. PATENT DOCUMENTS 7,652,293 B2 * 1/2010 Iki .......................... H10D 86/60 257/213
2022/0013608 A1 * 1/2022 Kim ................... H10D 86/0221
2022/0291556 A1 * 9/2022 Morita .............. G02F 1/136286
2024/0142834 A1 * 5/2024 Egami ............... G02F 1/136209

FOREIGN PATENT DOCUMENTS

JP 2015007806 1/2015

* cited by examiner

*Primary Examiner* — Joseph L Williams
(74) *Attorney, Agent, or Firm* — JCIPRNET

(57) ABSTRACT

An electro-optical device includes a substrate, a transistor including a semiconductor layer including a drain region, a source region, and a channel region and extending in a first direction, and a gate electrode, a scanning line, and a first light-blocking part, wherein the substrate, the semiconductor layer, the gate electrode, and a layer at which the scanning line is provided are arranged in a second direction, the first light-blocking part includes a first portion, a second portion, and a third portion, and a length of the first portion in the second direction, a length of the second portion in the second direction, and a length of the third portion in the second direction are longer in this order.

10 Claims, 11 Drawing Sheets

ELECTRO-OPTICAL DEVICE AND ELECTRONIC DEVICE

The present application is based on, and claims priority from JP Application Serial Number 2023-134867, filed Aug. 22, 2023, the disclosure of which is hereby incorporated by reference herein in its entirety.

BACKGROUND

1. Technical Field

The present disclosure relates to an electro-optical device and an electronic device.

2. Related Art

For electronic devices such as projectors, for example, electro-optical devices such as liquid crystal display apparatuses whose optical characteristics can be changed for each pixel are used. As an example of the electro-optical device, an electro-optical device described in JP 2015-7806 A has been known.

The liquid crystal display device described in JP 2015-7806 A includes a TFT (thin film transistor) substrate at which pixel electrodes are disposed in a matrix, an opposing substrate at which a counter electrode is formed, and a liquid crystal layer disposed between both the substrates. The TFT substrate includes a TFT including a semiconductor film, a gate insulating film, and a gate electrode, various wiring lines such as a signal line, and a light-blocking film. The light-blocking film can prevent photodegradation of the TFT.

However, in JP 2015-7806 A, the TFT, the layer at which the signal line is disposed, and the light-blocking film are disposed in this order. Therefore, a distance between the light blocking film and the TFT is increased due to the presence of the layer at which the signal line and the like are disposed. Therefore, it is difficult for a light-blocking film in the related art to sufficiently suppress incidence of light on the TFT.

SUMMARY

An aspect of an electro-optical device of the present disclosure includes a substrate, a transistor including a semiconductor layer including a drain region, a source region, and a channel region located between the drain region and the source region, and extending in a first direction, and a gate electrode, a scanning line electrically coupled to the gate electrode, and a first light-blocking part, wherein the substrate, the semiconductor layer, the gate electrode, and a layer at which the scanning line is provided are arranged in a second direction intersecting the first direction, the first light-blocking part includes a first portion, a second portion, and a third portion, the first portion is provided between the substrate and the layer at which the scanning line is provided, the second portion is provided between the semiconductor layer and the layer at which the scanning line is provided, the third portion is provided between the gate electrode and the layer at which the scanning line is provided, and a length of the first portion in the second direction, a length of the second portion in the second direction, and a length of the third portion in the second direction are longer in this order.

DESCRIPTION OF EMBODIMENTS

Figure 1:
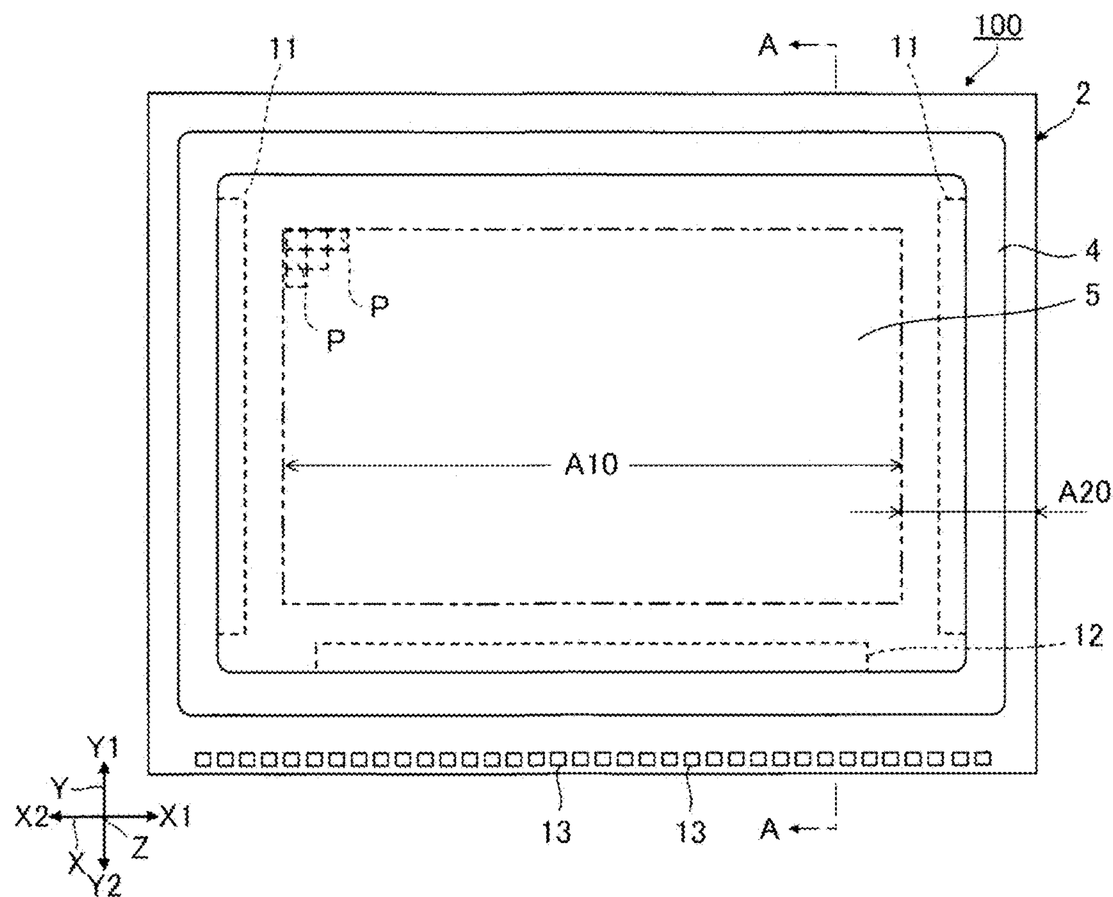
FIG. 1 is a plan view of an electro-optical device according to an embodiment.

Hereinafter, preferred embodiments of the present disclosure will be described with reference to the accompanying drawings. In the drawings, dimensions or scales of respective portions may be appropriately different from actual sizes, and there are portions schematically illustrated to facilitate understanding. Further, the scope of the present disclosure is not limited to these forms unless there is a particular statement that limits the present disclosure in the following description.

1. Electro-Optical Device

1A. Basic Configuration

Figure 2:
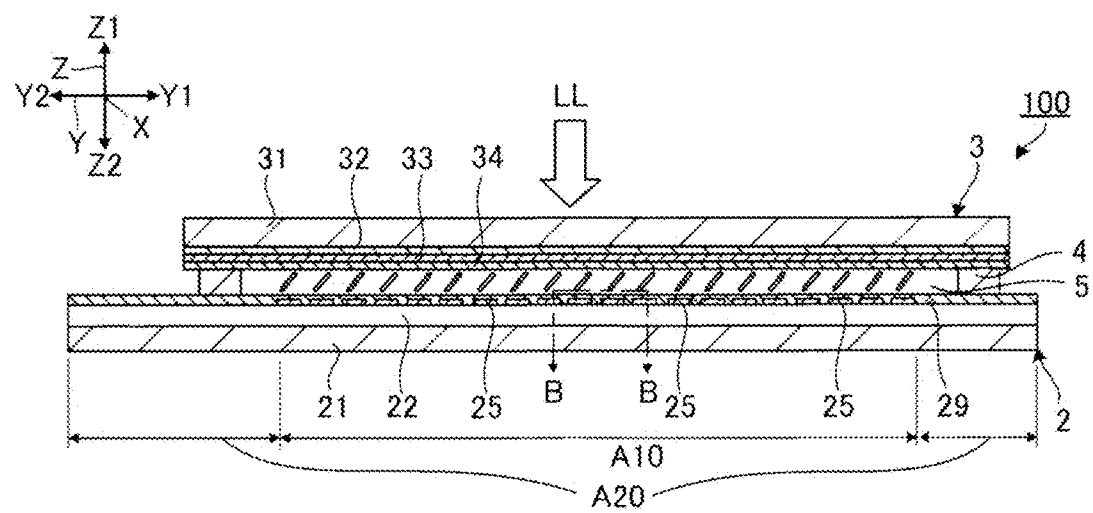
FIG. 2 is a cross-sectional view taken along a line A-A of the electro-optical device illustrated in FIG. 1.

FIG. 1 is a plan view of an electro-optical device 100 according to an embodiment. FIG. 2 is a cross-sectional view taken along the line A-A of the electro-optical device 100 illustrated in FIG. 1. Note that in FIG. 1, illustration of an opposing substrate 3 is omitted. Further, hereinafter, for convenience of description, an X-axis, a Y-axis, and a Z-axis orthogonal to each other will be used as appropriate. Further, one direction along the X-axis is referred to as an X1 direction, and a direction opposite to the X1 direction is referred to as an X2 direction. Similarly, one direction along the Y-axis is referred to as a Y1 direction, and a direction opposite to the Y1 direction is referred to as a Y2 direction. One direction along the Z-axis is referred to as a Z1 direction, and a direction opposite to the Z1 direction is referred to as a Z2 direction.

Further, in this specification, "an element β at an element α" means that the element β is located on an upper side of the element α. Therefore, "the element β at the element α" includes not only a case where the element β is in direct contact with element α, but also a case where the element α and the element β are separated from each other. Further, "electrical coupling" between the element α and the element includes not only a configuration where the element α and the element β are electrically coupled by being directly joined to each other, but also a configuration where the element α and the element β are electrically coupled indirectly through another conductive material.

The electro-optical device 100 illustrated in FIGS. 1 and 2 is a transmissive electro-optical device using an active matrix drive scheme. The electro-optical device 100 includes an element substrate 2, the opposing substrate 3, a frame-shaped sealing member 4, and a liquid crystal layer 5. As illustrated in FIG. 2, the element substrate 2, the liquid crystal layer 5 and the opposing substrate 3 are arranged in this order in the Z1 direction. Viewing from the Z1 direction or Z2 direction, which is a direction in which these overlap, is referred to as "plan view". Further, although a shape of the electro-optical device 100 illustrated in FIG. 1 is a rectangular shape in plan view, the shape may have a polygonal shape or a circular shape other than the rectangular shape.

The element substrate 2 illustrated in FIG. 2 includes a first substrate 21 having a light-transmitting property, a layered body 22 having a light-transmitting property, a plurality of pixel electrodes 25 having a light-transmitting property, and a first orientation film 29 having a light-transmitting property. The first substrate 21, the layered body 22, the plurality of pixel electrodes 25, and the first orientation film 29 are layered in this order in the Z1 direction. Note that a "light-transmitting property" means a light-transmitting property against visible light and may indicate that a transmittance of visible light is 50% or more. In addition, as will be described later in detail, the element substrate 2 includes a first light-blocking part 6 having a light-blocking property and a second light-blocking part 7 having a light-blocking property illustrated in FIGS. 5 and 6. Note that a "light shielding property" means a light shielding property against visible light, and may mean that a transmittance of the visible light is less than 50%, and may further be 10% or less.

The first substrate 21 corresponds to a "substrate". The first substrate 21 is a flat plate having a light-transmitting property and an insulating property, and is composed of a glass substrate or a quartz substrate, for example. The layered body 22 includes a plurality of insulating films having a light-transmitting property. In addition, the layered body 22 is provided with various wiring lines and the like. The pixel electrode 25 is used for applying an electric field to the liquid crystal layer 5. The pixel electrode 25 includes a transparent conductive material such as indium tin oxide (ITO), indium zinc oxide (IZO), and fluorine-doped tin oxide (FTO). Note that although not illustrated in the drawings, the element substrate 2 includes a plurality of dummy pixel electrodes surrounding the plurality of pixel electrodes 25 in plan view. In addition, the first orientation film 29 has a light-transmitting property and an insulating property. The first orientation film 29 aligns liquid crystal molecules in the liquid crystal layer 5. The first orientation film 29 is disposed to cover the plurality of pixel electrodes 25. A material of the first orientation film 29 is polyimide, silicon oxide, and the like.

The opposing substrate 3 is disposed opposite to the element substrate 2. The opposing substrate 3 includes a second substrate 31 having a light-transmitting property, an inorganic insulating layer 32 having a light-transmitting property, a common electrode 33 having a light-transmitting property, and a second orientation film 34 having a light-transmitting property. In addition, although not illustrated in the drawings, the opposing substrate 3 includes a light-blocking parting that surrounds the plurality of pixel electrodes 25 in plan view.

The second substrate 31, the inorganic insulating layer 32, the common electrode 33, and the second orientation film 34 are layered in this order in the Z2 direction. The second substrate 31 is a flat plate having a light-transmitting property and an insulating property, and is composed of a glass substrate or a quartz substrate, for example. The inorganic insulating layer 32 has a light-transmitting property and an insulating property, and is made of an inorganic material containing silicon, such as silicon oxide. The common electrode 33 is an opposing electrode disposed opposite to the plurality of pixel electrodes 25 through the liquid crystal layer 5. The common electrode 33 is used for applying an electric field to the liquid crystal layer 5. The common electrode 33 has a light-transmitting property and conductivity. The common electrode 33 contains, for example, a transparent conductive material such as ITO, IZO, and FTO. The second orientation film 34 has a light-transmitting property and an insulating property. The second orientation film 34 aligns liquid crystal molecules in the liquid crystal layer 5. A material of the second orientation film 34 is polyimide, silicon oxide and the like, for example.

The sealing member 4 is disposed between the element substrate 2 and the opposing substrate 3. The sealing member 4 is formed by using, for example, an adhesive containing various curable resins such as an epoxy resin. The sealing member 4 may include a gap material made of an inorganic material such as glass.

The liquid crystal layer 5 is disposed in a region surrounded by the element substrate 2, the opposing substrate 3, and the sealing member 4. The liquid crystal layer 5 is an electro-optical layer whose optical characteristics change depending on an electric field. The liquid crystal layer 5 includes liquid crystal molecules having positive or negative dielectric anisotropy. Orientation of the liquid crystal molecules changes depending on a voltage applied to the liquid crystal layer 5.

As illustrated in FIG. 1, a plurality of scanning line drive circuits 11, a signal line drive circuit 12 and a plurality of external terminals 13 are disposed at the element substrate 2. Some of the plurality of external terminals 13 are coupled to a wiring line (not illustrated) routed from the scanning line drive circuit 11 or the signal line drive circuit 12. Further, the plurality of external terminals 13 include a terminal to which a constant potential Vcom is applied. The terminal is electrically coupled to the common electrode 33 of the opposing substrate 3 through a wiring line and a conductive material (not illustrated). In this manner, the constant potential Vcom is supplied to the common electrode 33.

The electro-optical device 100 includes a display region A10 in which an image is displayed, and a peripheral region A20 located outside the display region A10 in plan view. A plurality of pixels P disposed in a matrix are provided in the display region A10. The plurality of pixel electrodes 25 are disposed in a one-to-one relationship for the plurality of pixels P. The above-described common electrode 33 is provided in common for the plurality of pixels P. Further, the peripheral region A20 surrounds the display region A10 in plan view. The scanning line drive circuit 11 and the signal line drive circuit 12 are disposed in the peripheral region A20.

In the present embodiment, the electro-optical device 100 is of a transmissive type. More specifically, as illustrated in FIG. 2, after entering the opposing substrate 3, light LL is modulated before being emitted from the element substrate 2, whereby an image is displayed. Note that light having entered the element substrate 2 may be modulated before being emitted from the opposing substrate 3, whereby an image is displayed.

Further, the electro-optical device 100 is applied to, for example, a display device that performs color display, of a personal computer, a smartphone, or the like, which will be described below. When the electro-optical device 100 is applied to the display device, a color filter is appropriately used for the electro-optical device 100. Further, the electro-optical device 100 is applied to, for example, a projection type projector, which will be described later. In this case, the electro-optical device 100 functions as a light valve. In this case, the color filter is omitted from the electro-optical device 100.

1B. Electrical Configuration of Element Substrate 2

Figure 3:
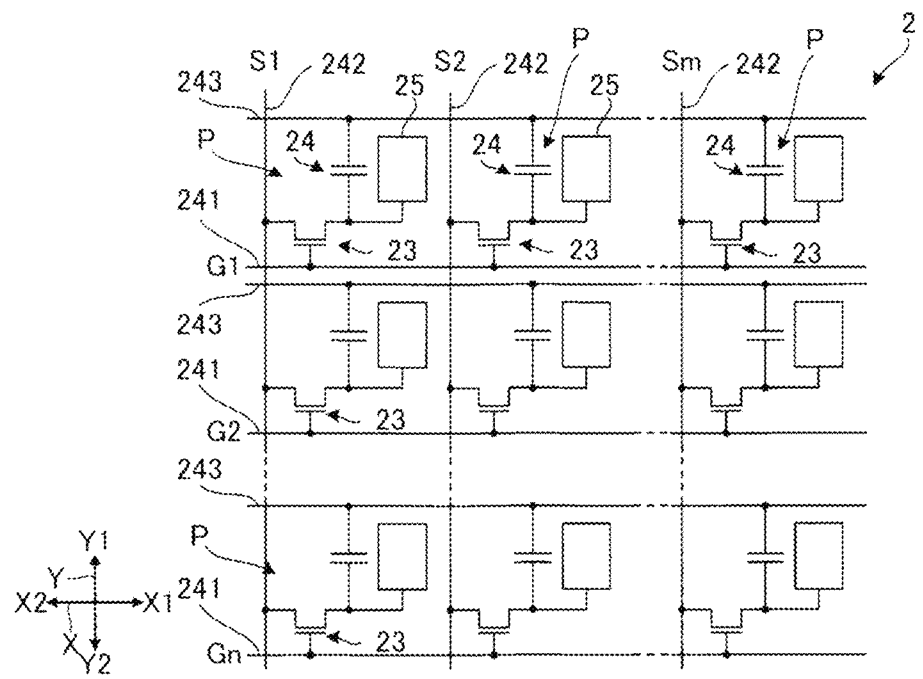
FIG. 3 is an equivalent circuit diagram illustrating an electrical configuration of an element substrate in FIG. 1.

FIG. 3 is an equivalent circuit diagram illustrating an electrical configuration of the element substrate 2 of FIG. 1. As illustrated in FIG. 3, the element substrate 2 includes a plurality of transistors 23, n scanning lines 241, m signal lines 242 and n constant potential lines 243. n and m are integers equal to or greater than 2. The transistor 23 is disposed in a manner corresponding to each of intersections of the n scanning lines 241 and the m signal lines 242. Each of the transistors 23 is a Thin Film Transistor (TFT) that functions as a switching element, for example. Each of the transistors 23 includes a gate, a source, and a drain.

Each of the n scanning lines 241 extends in the X1 direction, and the n scanning lines 241 are disposed at equal intervals in the Y1 direction. The n scanning lines 241 are electrically coupled to the gates of the plurality of corresponding transistors 23, respectively. The n scanning lines 241 are electrically coupled to the scanning line drive circuit 11 illustrated in FIG. 1. Scanning signals G1, G2, . . . , and Gn are supplied line-sequentially from the scanning line drive circuit 11 to the 1st to n-th scanning lines 241.

Each of the m signal lines 242 illustrated in FIG. 3 extends in the Y1 direction, and the m signal lines 242 are arranged at equal intervals in the X1 direction. The m signal lines 242 are respectively electrically coupled to the sources of the plurality of corresponding transistors 23. The m signal lines 242 are electrically coupled to the signal line drive circuit 12 illustrated in FIG. 1. Image signals S1, S2, and Sm are supplied in parallel from the signal line drive circuit 12 to the 1st to m-th signal lines 242.

The n scanning lines 241 and the m signal lines 242 illustrated in FIG. 3 are electrically insulated from each other and disposed in a grid pattern in plan view. A region surrounded by two adjacent scanning lines 241 and two adjacent signal lines 242 corresponds to the pixel P. The transistor 23, the pixel electrode 25 and a capacitive element 24 are provided for each pixel P. The pixel electrode 25 is provided in a one-to-one relationship for the transistor 23. Each pixel electrode 25 is electrically coupled to the drain of the corresponding transistor 23.

The n constant potential lines 243 are extended in the X1 direction, and the n constant potential lines 243 are arranged at even intervals in the Y2 direction. Further, the n constant potential lines 243 are electrically insulated from the n scanning lines 241 and the m signal lines 242, and are disposed at intervals from these lines. The constant potential Vcom is applied to each constant potential line 243. Each of the n constant potential lines 243 is electrically coupled to one of the two electrodes of the corresponding capacitive element 24. Each capacitive element 24 is a capacitive element for holding the potential of the pixel electrode 25. The capacitive element 24 is provided in a one-to-one relationship for the transistor 23. In addition, the other of the two electrodes of each capacitive element 24 is electrically coupled to the corresponding pixel electrode 25. Therefore, the constant potential Vcom is applied to one electrode of the capacitive element 24, and the other electrode is electrically coupled to the drain of the transistor 23.

When the scanning signals G1, G2, . . . , and Gn sequentially become active, and the n scanning lines 241 are sequentially selected, the transistors 23 coupled to the selected scanning lines 241 are turned on. Then, the image signals S1, S2, . . . , and Sm with values corresponding to the gradation to be displayed through the m signal lines 242 are taken by the pixels P corresponding to the selected scanning lines 241, and applied to the pixel electrodes 25. In this manner, the voltage corresponding to the gradation to be displayed is applied to a liquid crystal capacitance formed between the pixel electrode 25 and the common electrode 33 in FIG. 2, and the orientation of the liquid crystal molecules changes in accordance with the applied voltage. In addition, the applied voltage is held by the capacitive element 24. Light is modulated due to such changes in the orientation of liquid crystal molecules, making gradation display possible.

1C. Structure of Part of Element Substrate 2

Figure 4:
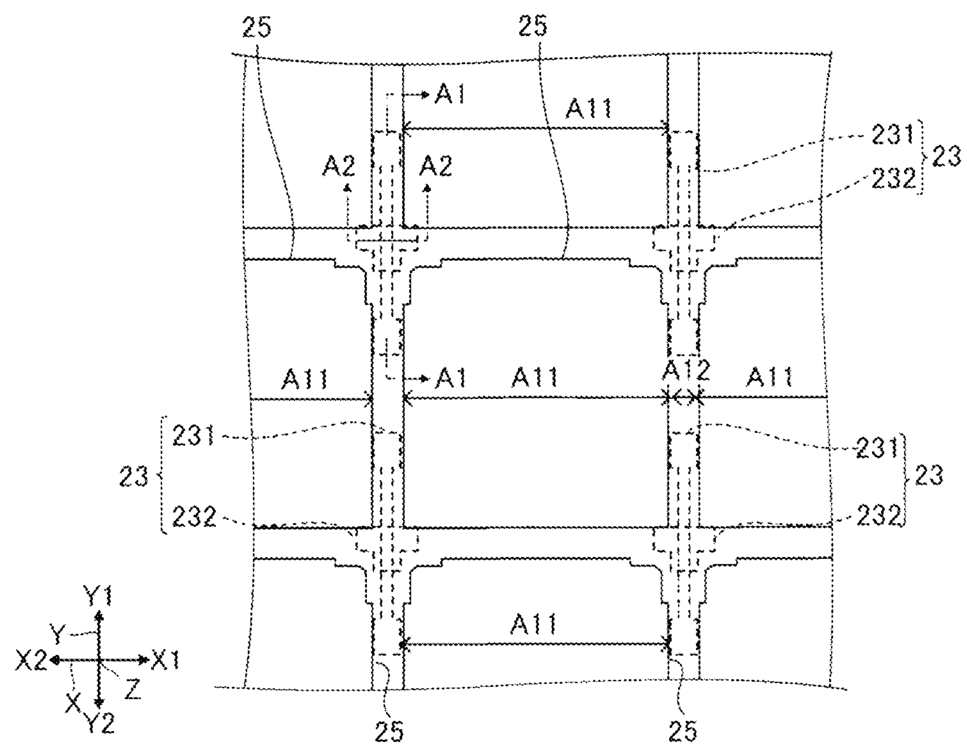
FIG. 4 is a plan view illustrates a part of the element substrate in a display region in FIG. 2.

FIG. 4 illustrates a part of the element substrate 2 in the display region A10 of FIG. 2. As illustrated in FIG. 4, the display region A10 includes a plurality of opening regions A11, and a light-blocking region A12. The plurality of opening regions A11 are disposed in a matrix in plan view. A shape of the light-blocking region A12 in plan view is a frame shape located between the plurality of opening regions A11. Each opening region A11 is a region where the pixel electrode 25 is disposed, and is a region through which light is transmitted. On the other hand, the transistor 23 is disposed in the light-blocking region A12. In addition, although not illustrated in FIG. 4, various wiring lines such as the scanning line 241, the signal line 242 and the constant potential line 243, and the capacitive element 24 illustrated in FIG. 3 are disposed in the light-blocking region A12.

Figure 5:
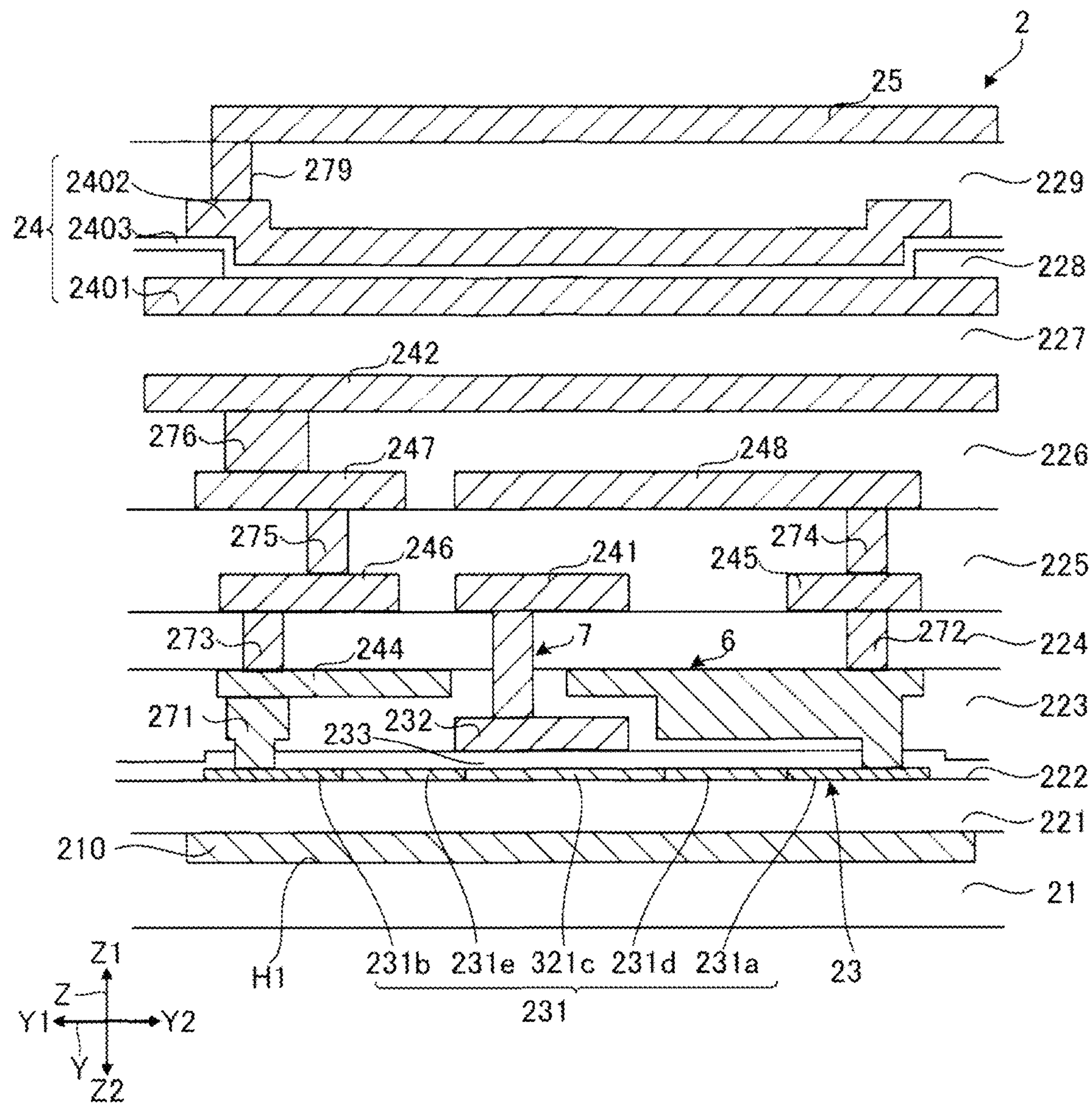
FIG. 5 is a cross-sectional view taken along a line A1-A1 in FIG. 4.
Figure 6:
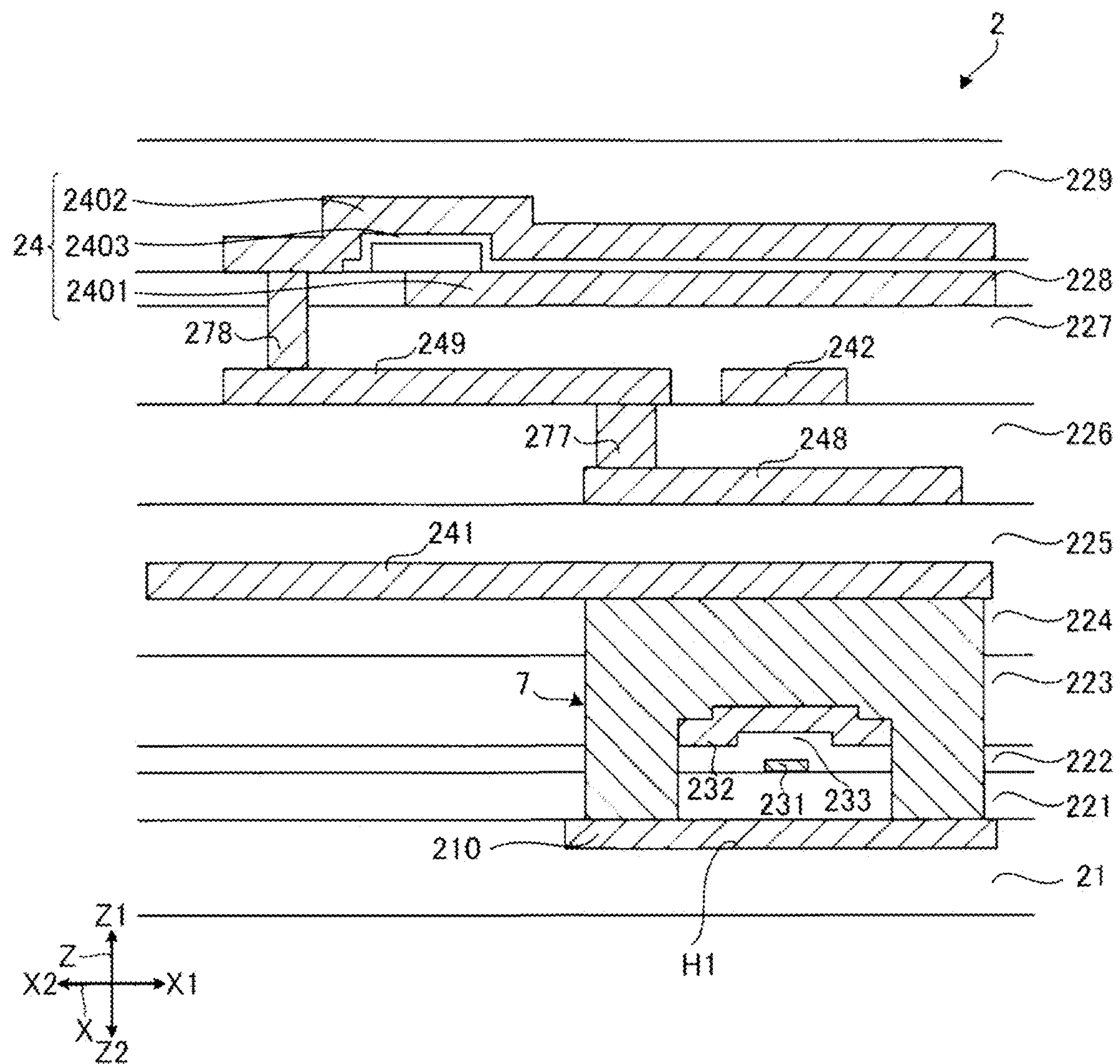
FIG. 6 is a cross-sectional view taken along a line A2-A2 in FIG. 4.

FIG. 5 is a cross-sectional view taken along the line A1-A1 in FIG. 4. FIG. 6 is a cross-sectional view taken along the line A2-A2 in FIG. 4. The Y1 direction corresponds to a “first direction”. The Z1 direction corresponds to a “second direction intersecting the first direction”. The X1 direction corresponds to a “third direction intersecting the first direction and the second direction”. Further, viewing in the Z1 direction or the Z2 direction is referred to as plan view.

As illustrated in FIGS. 5 and 6, the element substrate 2 includes the first substrate 21 as the “substrate”, and the layered body 22. The layered body 22 includes a plurality of insulating layers 221, 222, 223, 224, 225, 226, 227, 228, and 229. The insulating layers 221, 222, 223, 224, 225, 226, 227, 228, and 229 are layered in this order from the first substrate 21. The insulating layers 221 to 229 have a light-transmitting property and an insulating property. Each material of the insulating layers 221 to 229 is an inorganic material containing silicon such as silicon oxide and silicon oxynitride, for example.

The transistor 23, the scanning line 241, the signal line 242, the first light-blocking part 6, and the second light-blocking part 7 are disposed at the layered body 22. Further, relay electrodes 244, 245, 246, 247, 248, and 249 are disposed at the layered body 22. Further, a third light-blocking part 210 is disposed at the first substrate 21.

As described above, the first substrate 21 is composed of a glass substrate or a quartz substrate, for example. The first substrate 21 includes a recess H1. The recess H1 is a depression formed at the first substrate 21, and formed for each transistor 23. The recess H1 is formed along the Y1 direction, which is an extending direction of a semiconductor layer 231 to be described later.

The third light-blocking part 210 is disposed in the recess H1. The third light-blocking part 210 is formed by using a damascene method. The third light-blocking part 210 is provided for preventing entry of light into the semiconductor layer 231 of the transistor 23. Note that the first substrate 21 need not include the recess H1. In this case, the third light-blocking part 210 is disposed at a planar surface facing the Z1 direction of the first substrate 21.

The transistor 23 is disposed at the insulating layer 221. The transistor 23 includes the semiconductor layer 231, a gate electrode 232, and a gate insulating film 233. The semiconductor layer 231 is disposed at the insulating layer 221. The gate electrode 232 is disposed at the insulating layer 222. The gate insulating film 233 is interposed between the gate electrode 232 and the semiconductor layer 231. A region corresponding to the gate electrode 232 in the insulating layer 222 in plan view corresponds to the gate insulating film 233.

Figure 7:
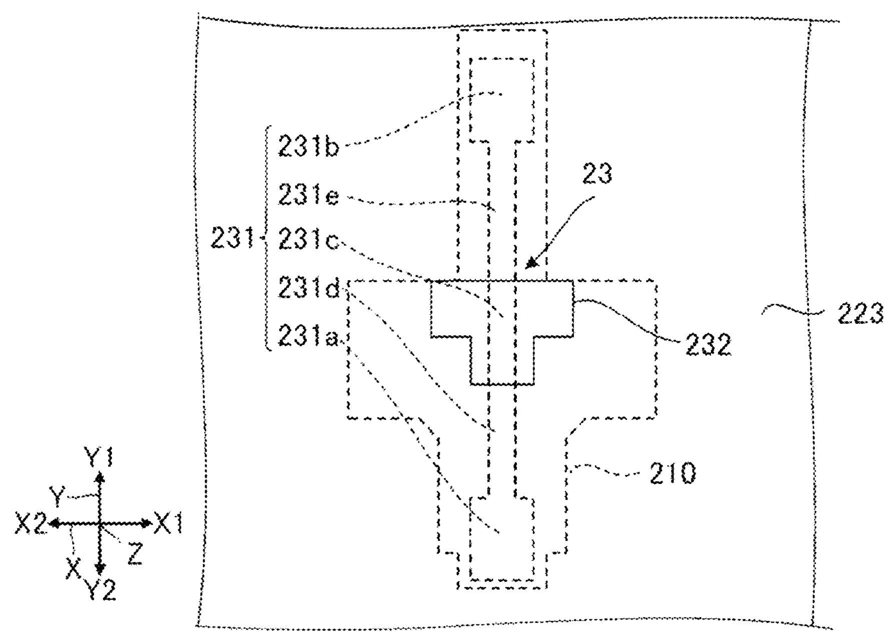
FIG. 7 is a plan view illustrating a transistor in FIG. 5.

FIG. 7 is a plan view of the transistor 23 in FIG. 5. The transistor 23 illustrated in FIG. 7 has a lightly doped drain (LDD) structure. The semiconductor layer 231 extends in the Y1 direction as the "first direction" in plan view. The semiconductor layer 231 includes a drain region 231*a*, a source region 231*b*, a channel region 231*c*, a low-concentration drain region 231*d* and a low-concentration source region 231*e*. The channel region 231*c* is located between the drain region 231*a* and the source region 231*b*. The low-concentration drain region 231*d* is located between the channel region 231*c* and the drain region 231*a*. The low-concentration source region 231*e* is located between the channel region 231*c* and the source region 231*b*. The semiconductor layer 231 is made of polysilicon, for example. A region excluding the channel region 231*c* is doped with impurities that increase conductivity. An impurity concentration in the low-concentration drain region 231*d* is lower than an impurity concentration in the drain region 231*a*. An impurity concentration in the low-concentration source region 231*e* is lower than an impurity concentration in the source region 231*b*. Note that, for example, the transistor 23 need not have an LDD structure, and the low-concentration source region 231*e* and the low-concentration drain region 231*d* may be omitted.

The gate electrode 232 is made of polysilicon doped with impurities that increase conductivity, for example. Note that the gate electrode 232 may be made of a conductive material of a metal, metal oxide, and metal compound. The gate electrode 232 overlaps the channel region 231*c* of the semiconductor layer 231 in plan view. In addition, the gate insulating film 233 is composed of a silicon oxide film deposited by a heat oxidation or chemical vapor deposition (CVD) method or the like. Such a transistor 23 overlaps the third light-blocking part 210 in plan view.

As illustrated in FIGS. 5 and 6, the first light-blocking part 6 and the second light-blocking part 7 are disposed at the insulating layers 222 and 223. Each of the first light-blocking part 6 and the second light-blocking part 7 is formed of, for example, a layered body of a plurality of layers. Further, each of the first light-blocking part 6 and the second light-blocking part 7 is formed by using, for example, a damascene method. The first light-blocking part 6 is electrically coupled to the drain region 231*a* of the semiconductor layer 231. The second light-blocking part 7 is electrically coupled to the gate electrode 232. Further, as illustrated in FIG. 6, a part of the second light-blocking part 7 extends through the insulating layer 221. The second light-blocking part 7 is electrically coupled to the third light-blocking part 210. The third light-blocking part 210 functions as a back gate.

As illustrated in FIG. 5, the relay electrode 244 is disposed at the insulating layer 223. The relay electrode 244 is electrically coupled to the source region 231*b* of the semiconductor layer 231 through a contact 271. For example, the contact 271 is a contact plug that fills a hole extending through the insulating layers 222 and 223. Note that the relay electrode 244 and the contact 271 may be integrally formed of the same material, or may be formed of separated materials.

As illustrated in FIG. 5, the scanning line 241, the relay electrode 245, and the relay electrode 246 are disposed at the insulating layer 224. The scanning line 241 is electrically coupled to the gate electrode 232 through the second light-blocking part 7. The relay electrode 245 is electrically coupled to the first light-blocking part 6 through a contact 272 extending through the insulating layer 224. The relay electrode 246 is electrically coupled to the relay electrode 244 through a contact 273 extending through the insulating layer 224.

The relay electrode 247 and the relay electrode 248 are disposed at the insulating layer 225. The relay electrode 247 is electrically coupled to the relay electrode 246 through a contact 275 extending through the insulating layer 225. In addition, the relay electrode 248 is electrically coupled to the relay electrode 245 through a contact 274 extending through the insulating layer 225.

The signal line 242 is disposed at the insulating layer 226. The signal line 242 is electrically coupled to the relay electrode 247 through a contact 276 extending through the insulating layer 226. Therefore, the signal line 242 is electrically coupled to the source region 231*b* through the contacts 276, the relay electrode 247, the contacts 275, the relay electrodes 246, the contact 273, the relay electrode 244, and the contact 271.

As illustrated in FIG. 6, the relay electrode 249 is disposed at the insulating layer 226. The relay electrode 249 is electrically coupled to the relay electrode 248 through a contact 277 extending through an insulating layer.

The capacitive element 24 is disposed at the insulating layer 227. The capacitive element 24 includes a pair of electrodes 2401 and 2402, and a dielectric layer 2403. The electrode 2401 is disposed at the insulating layer 227. The electrode 2402 is disposed at the insulating layer 228. The dielectric layer 2403 is disposed between the electrode 2401 and the electrode 2402. The electrode 2401 also serves as the constant potential line 243 in FIG. 2. Additionally, as illustrated in FIG. 6, the electrode 2402 is electrically coupled to the relay electrode 249 through a contact 278 extending through the insulating layers 227 and 228. Therefore, as illustrated in FIG. 5 or 6, the electrode 2402 is electrically coupled to the drain region 231*a* through the contact 278, the relay electrode 249, the contact 277, the relay electrode 248, the contact 274, the relay electrode 245, the contact 272, and the first light-blocking part 6.

As illustrated in FIG. 5, the pixel electrode 25 is disposed at the insulating layer 229. The pixel electrode 25 is electrically coupled to the electrode 2402 through a contact 279 extending through the insulating layer 229.

For example, each of the scanning line 241, the signal line 242, the electrode 2401, the electrode 2402, the relay electrodes 244, 245, 246, 247, 248, and 249 described above contains metal such as tungsten (W), titanium (Ti), chromium (Cr), iron, and aluminum (Al), metal nitride, metal silicide, and the like. These may be a single layer or a laminate. For example, these are formed of a layered body of an aluminum film and a titanium nitride film.

Further, each of the contacts 271 to 279 described above contains metal such as tungsten (W), titanium (Ti), chromium (Cr), iron (Fe), and aluminum (Al), metal nitride, metal silicide, and the like. Each of the contacts 271 to 279 may be a single layer or a laminate. In addition, each of the contacts 271 to 279 may be formed integrally with an electrode or a wiring line coupled thereto, or may be formed separately.

Note that the configuration of the element substrate 2 illustrated in FIGS. 5 and 6 is merely an example. For example, other capacitive elements other than the capacitive element 24 may be included. Additionally, the scanning line 241, the signal line 242, and the capacitive element 24 are arranged in this order in the Z1 direction, but need not be arranged in this order.

1C. First Light-Blocking Part 6 and Second Light-Blocking Part 7

Figure 8:
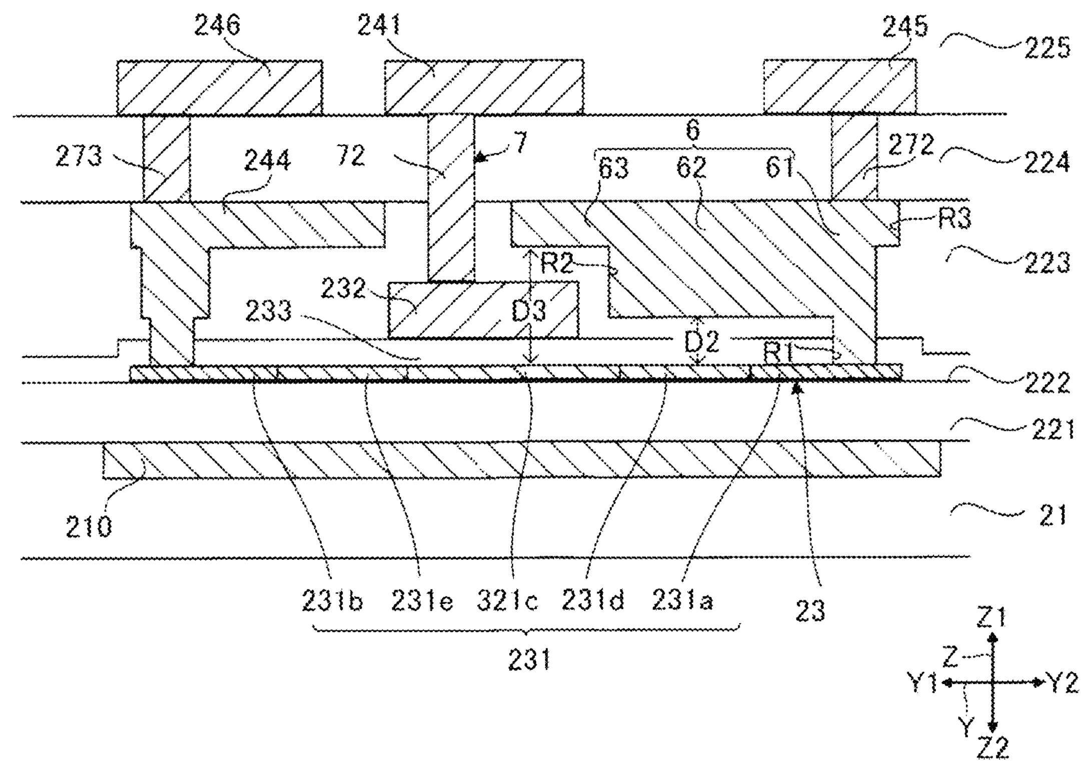
FIG. 8 is an enlarged view of a first light-blocking part and a second light-blocking part in FIG. 5.

FIG. 8 is an enlarged view of the first light-blocking part 6 and the second light-blocking part 7 in FIG. 5. As illustrated in FIG. 8, the first substrate 21, the semiconductor layer 231, the gate electrode 232, and the insulating layer 225 are arranged in the Z2 direction which is the "second direction intersecting the first direction". The insulating layer 225 is a layer at which the scanning line 241 is provided. In addition, the first light-blocking part 6 and the second light-blocking part 7 are disposed between the first substrate 21 and the insulating layer 225.

Figure 9:
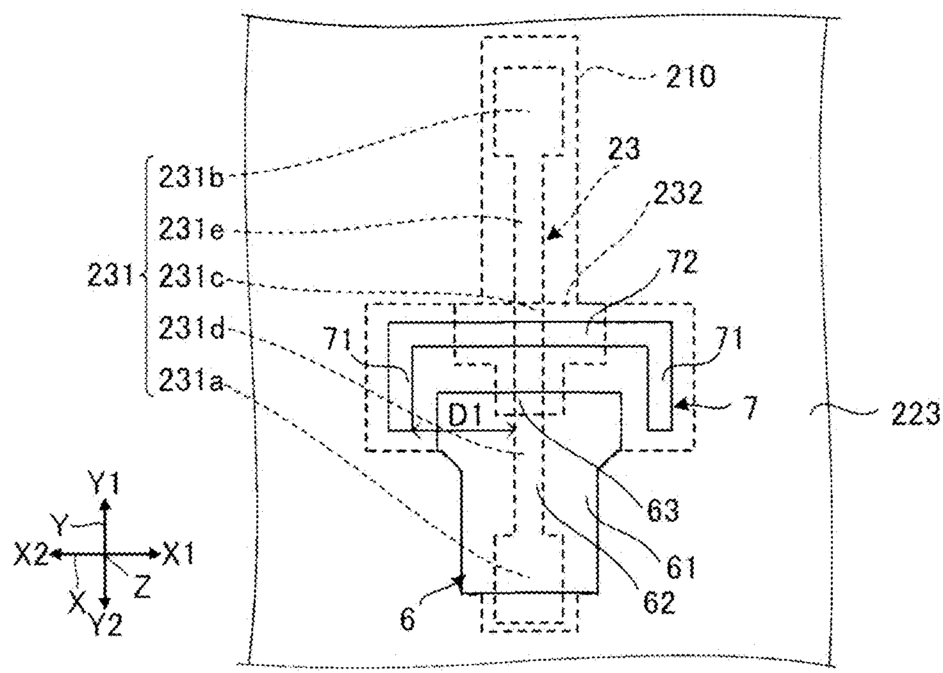
FIG. 9 is a plan view of the first light-blocking part and the second light-blocking part.
Figure 10:
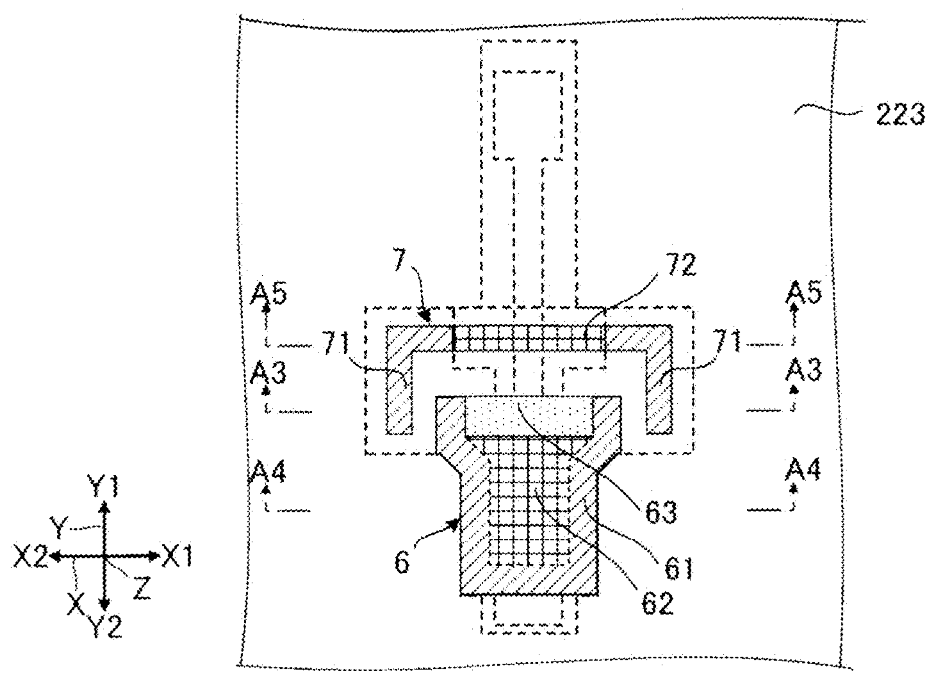
FIG. 10 is a plan view of the first light-blocking part and the second light-blocking part.

Each of FIGS. 9 and 10 is a plan view of the first light-blocking part 6 and the second light-blocking part 7. As illustrated in FIG. 9, the first light-blocking part 6 and the second light-blocking part 7 are disposed to be separated from each other. The first light-blocking part 6 is located in the Y2 direction with respect to the second light-blocking part 7 in plan view. The first light-blocking part 6 overlaps a part of the drain region 231*a* of semiconductor layer 231, and the low-concentration drain region 231*d* in plan view. Further, the second light-blocking part 7 overlap a part of the gate electrode 232 and a part of the channel region 231*c* in plan view. Further, the first light-blocking part 6 and the second light-blocking part 7 overlap the third light-blocking part 210 in plan view. The second light-blocking part 7 is located outside the first light-blocking part 6 in plan view.

The light-blocking part 6 includes a first portion 61, a second portion 62, and a third portion 63. The second light-blocking part 7 includes two fourth portions 71 and a fifth portion 72. In FIG. 10, in order to facilitate understanding, the first portion 61 is hatched, the second portion 62 is meshed, and the third portion 63 is dotted. Further, the fourth portion 71 is hatched, and the fifth portion 72 is dotted.

As illustrated in FIG. 10, the first portion 61 is provided outside the second portion 62 and the third portion 63 in plan view. To be specific, in plan view, the first portion 61 includes a portion located in the X1 direction with respect to the second portion 62 and the third portion 63, a portion located in the X2 direction with respect to the second portion 62 and the third portion 63, and a portion located in the Y2 direction with respect to the second portion 62. The second portion 62 is located in the Y2 direction with respect to the third portion 63 in plan view. As illustrated in FIGS. 9 and 10, the first portion 61 overlaps the drain region 231*a* in plan view. The second portion 62 overlaps the low-concentration drain region 231*d* in plan view. The third portion 63 overlaps the gate electrode 232 in plan view.

As illustrated in FIG. 10, the two fourth portions 71 are located on both sides of the fifth portion 72 in plan view, and are coupled to the fifth portion 72. The fourth portion 71 includes a portion extending along the Y-axis, and a portion extending along the X-axis in plan view. The fifth portion 72 extends along the X-axis, and is located between the two fourth portions 71 in plan view. As illustrated in FIGS. 9 and 10, the fifth portion 72 overlaps the gate electrode 232 in plan view. Each of the two fourth portions 71 is located outside the first portion 61 in a direction along the X-axis in plan view. In addition, the second light-blocking part 7 and the first portion 61 surround the low-concentration drain region 231*d* in plan view.

Figure 11:
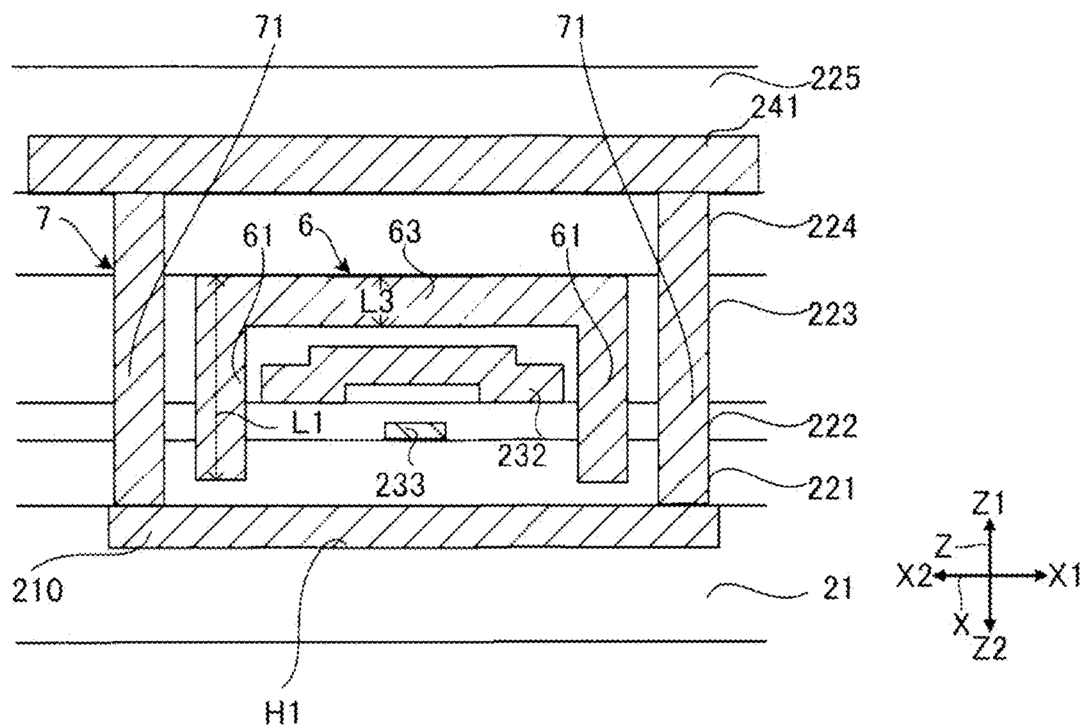
FIG. 11 is a cross-sectional view taken along a line A3-A3 in FIG. 10.
Figure 12:
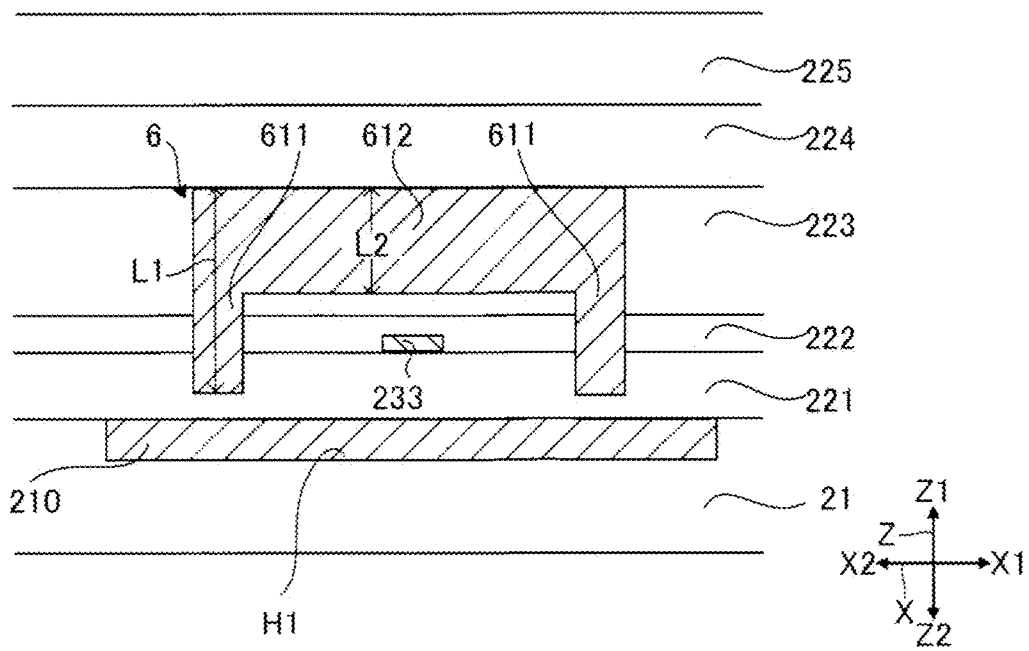
FIG. 12 is a cross-sectional view taken along a line A4-A4 in FIG. 10.
Figure 13:
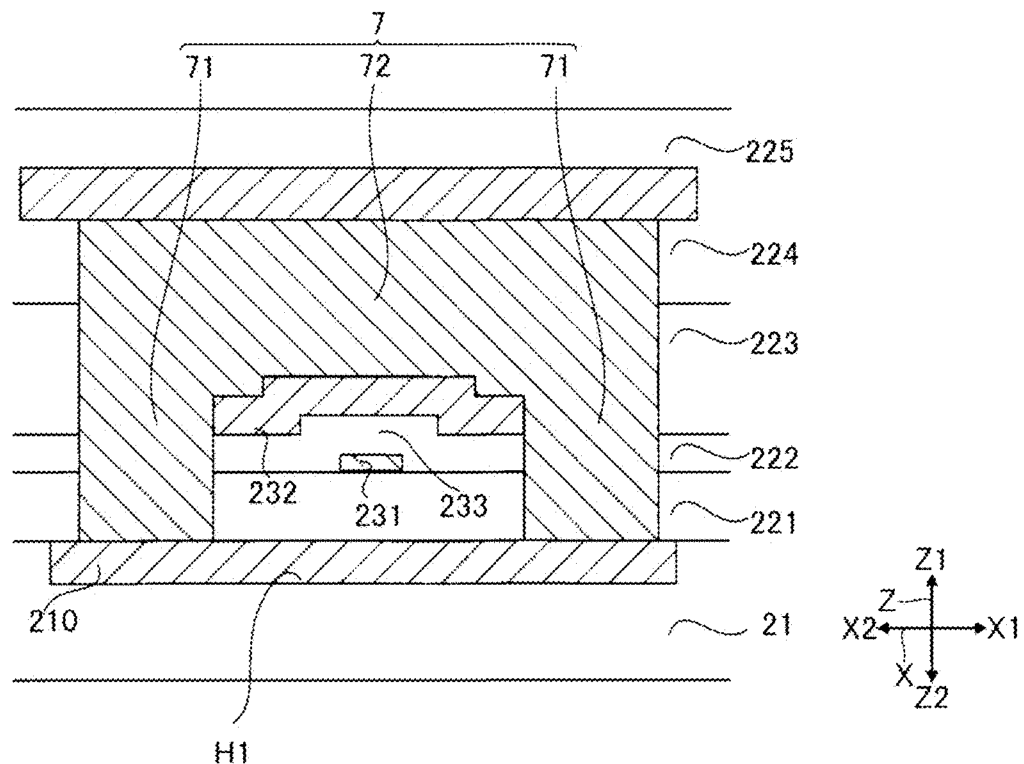
FIG. 13 is a cross-sectional view taken along a line A5-A5 in FIG. 10.

FIG. 11 is a cross-sectional view taken along the line A3-A3 in FIG. 10. FIG. 12 is a cross-sectional view taken along the line A4-A4 in FIG. 10. FIG. 13 is a cross-sectional view taken along the line A5-A5 in FIG. 10.

As illustrated in FIGS. 11 and 12, the first light-blocking part 6 is separated from the scanning line 241 and the third light-blocking part 210. The first light-blocking part 6 is not coupled to each of the scanning line 241 and the third light-blocking part 210. Further, each of the second portion 62 and the third portion 63 of the first light-blocking part 6 is separated from the semiconductor layer 231. On the other hand, as illustrated in FIG. 8, the first portion 61 is directly coupled to the drain region 231*a* of the semiconductor layer 231. Therefore, the first light-blocking part 6 has a pixel potential.

As illustrated in FIGS. 11 and 13, the fourth portion 71 of the second light-blocking part 7 is coupled to the scanning line 241 and the third light-blocking part 210. The fifth portion 72 is coupled to the scanning line 241 and the gate electrode 232. Therefore, the second light-blocking part 7 has a gate potential, and has a potential different from that of the first light-blocking part 6.

As described above, the first light-blocking part 6 includes the first portion 61, the second portion 62, and the third portion 63. As illustrated in FIGS. 11 and 12, the first portion 61 is provided between the first substrate 21 and the insulating layer 225. In particular, the first portion 61 extends in the Z1 direction from the insulating layer 221, which is a layer between the first substrate 21 and the semiconductor layer 231, to the insulating layer 224. Additionally, as illustrated in FIG. 12, the second portion 62 is provided between the semiconductor layer 231 and the insulating layer 225. Additionally, as illustrated in FIG. 11, the third portion 63 is provided between the gate electrode 232 and the insulating layer 225. Then, as illustrated in FIG. 11 or 12, a length L1 of the first portion 61 in the Z1 direction, a length L2 of the second portion 62 in the Z1 direction, and a length L3 of the third portion 63 in the Z1 direction are longer in this order. Therefore, the lengths L1, L2, and L3 satisfy a relationship L3<L2<L1.

According to such a configuration of the first light-blocking part 6, the first light-blocking part 6 can be disposed closer to the semiconductor layer 231 than in the related art. For this reason, incidence of light on the semiconductor layer 231 can be suppressed more effectively than in the related art. Thus, destabilization of operation of the transistor 23 can be suppressed. As a result, a risk of occurrence of display defects such as luminance unevenness can be suppressed. Therefore, it is possible to curb deterioration in display quality.

As described above, the first light-blocking part 6 is disposed between the semiconductor layer 231 and the insulating layer 225 which is a layer at which the scanning line 241 is provided. From another viewpoint, no other wiring line or electrode is interposed between the first light-blocking part 6 and the semiconductor layer 231. Therefore, it is possible to bring the first light-blocking part 6 close to the semiconductor layer 231. Thus, as compared to a case where wiring lines and electrodes are interposed between the first light-blocking part 6 and the semiconductor layer 231, incidence of light on the semiconductor layer 231 in the Z1 direction can be suppressed by the light-blocking part 6.

In addition, in the first light-blocking part 6, the first portion 61 is disposed outside the semiconductor layer 231 in the X-axis. Therefore, for example, it is possible to suppress incidence of light in the X1 direction and the X2 direction on the semiconductor layer 231 by the first portion 61. In addition, the first portion 61 includes a portion disposed in the Y2 direction of the semiconductor layer 231. Therefore, it is possible to suppress incidence of light in the Y1 direction on the semiconductor layer 231 by the first portion 61. Further, the second portion 62 and the third portion 63 are provided in the Z1 direction with respect to the semiconductor layer 231. For this reason, it is possible to suppress incidence of light in the Z2 direction on the semiconductor layer 231. In addition, since the lengths L1, L2, and L3 satisfy the relationship L3<L2<L1, the first light-blocking part 6 close to the above described semiconductor layer 231 can be achieved. For this reason, it is possible to more effectively suppress incidence of light on the transistor 23 by the first light-blocking part 6 than in the related art.

In the present embodiment, as illustrated in FIG. 9, the first light-blocking part 6 overlaps the low-concentration drain region 231*d* in plan view. Specifically, the second portion 62 overlaps the low-concentration drain region 231*d* in plan view. The low-concentration drain region 231*d* is a region in which light leakage is most likely to occur in the semiconductor layer 231. Therefore, since the second portion 62 overlaps the low-concentration drain region 231*d* in plan view, incidence of light on the low-concentration drain region 231*d* can be effectively suppressed by the first light-blocking part 6. Therefore, it is possible to effectively suppress the light leakage. Further, no wiring line or electrode is interposed between the first light-blocking part 6 and the low-concentration drain region 231*d*. Therefore, the first light-blocking part 6 can be brought close to the low-concentration drain region 231*d*. Therefore, it is possible to suppress incidence of light in the Z1 direction on the low-concentration drain region 231*d* by the first light-blocking part 6.

In the present embodiment, the transistor 23 has an LDD structure. However, the low-concentration source region 231*e* and the low-concentration drain region 231*d* may be omitted. In this case, the semiconductor layer 231 includes the drain region 231*a*, the source region 231*b*, and the channel region 231*c*. In this case, the second portion 62 may overlap a junction between the drain region 231*a* and the source region 231*b* in plan view. The junction is a region where light leakage is likely to occur. Therefore, since the second portion 62 overlaps the junction in plan view, it is possible to effectively suppress incidence of light on the junction by the first light-blocking part 6. Therefore, it is possible to effectively suppress the light leakage.

Further, the first light-blocking part 6 overlaps the gate electrode 232 in plan view. Specifically, the third portion 63 overlaps a part of the gate electrode 232 in plan view. For this reason, as compared with a case where the third portion 63 do not overlap the gate electrode 232 in plan view, it is possible to suppress incidence of light on the semiconductor layer 231, particularly on the low-concentration drain region 231*d*. For example, by the third portion 63, infiltration of light passing between the relay electrode 246 and the scanning line 241 illustrated in FIG. 8 into the low-concentration drain region 231*d* can be suppressed.

As illustrated in FIG. 8, the second portion 62 is closer to the semiconductor layer 231 than the third portion 63 in a direction along the Z-axis. In other words, as illustrated in FIG. 8, a distance D2 between the second portion 62 and the semiconductor layer 231 is shorter than a distance D3 between the third portion 63 and the semiconductor layer 231. Therefore, as compared to a case where the second portion 62 is farther from the semiconductor layer 231 than the third portion 63 in the direction along the Z-axis, the second portion 62 can be brought closer to the semiconductor layer 231. Therefore, incidence of light on the semiconductor layer 231 can be more effectively exhibited.

In particular, a surface of the second portion 62 facing the semiconductor layer 231 may be provided at a position between a surface of the gate electrode 232 facing the semiconductor layer 231 and a surface of the gate electrode 232 facing the scanning line 241 in the direction along the Z-axis. By providing the surface of the second portion 62 facing the semiconductor layer 231 at such a position, the distance between the second portion 62 and the semiconductor layer 231 can be made very short. Furthermore, since the second portion 62 overlaps the low-concentration drain region 231*d* in plan view, the second portion 62 can be brought very close to the low-concentration drain region 231*d*. That is, a distance between the second portion 62 and the low-concentration drain region 231*d* can be made much shorter than that in the related art. For this reason, it is possible to suppress incidence of light along the Z1 direction on the semiconductor layer 231, particularly on the low-concentration drain region 231*d*. Suppressing the incidence of light along the Z1 direction is particularly effective in a mode in which light is incident from the opposing substrate 3 as in the present embodiment.

Further, the first portion 61 is directly coupled to the drain region 231*a*. Thus, a potential of the first light-blocking part 6 and a potential of the drain region 231*a* of the semiconductor layer 231 are the same potential. Therefore, defects are less likely to occur even when the first light-blocking part 6 is brought closer to the semiconductor layer 231. Therefore, it is easy to bring the first light-blocking part 6 close to the semiconductor layer 231. The first light-blocking part 6 can be brought close to the semiconductor layer 231, thus a light-blocking property due to the light-blocking part 6 can be increased as compared to the related art.

The first portion 61 is directly coupled to the drain region 231*a*, thus the pixel potential is supplied to the first light-blocking part 6. Therefore, the first light-blocking part 6 does not have the gate potential. Therefore, even when the first light-blocking part 6 is disposed near the semiconductor layer 231, it is possible to suppress influence of the gate potential on the semiconductor layer 231. More specifically, an increase in off-leak current due to the gate potential coming closer to a region other than the channel region 231*c* of the semiconductor layer 231 can be suppressed. In this manner, a reduction in display quality due to occurrence of black spots and the like can be suppressed. Note that the off-leak current is a leakage current that flows when the transistor 23 is turned off.

Additionally, as illustrated in FIG. 9, the second light-blocking part 7 and the first light-blocking part 6 surround the low-concentration drain region 231*d* in plan view. Therefore, incidence of light from a direction along an XY plane on the low-concentration drain region 231*d* can be effectively suppressed.

Further, in the present embodiment, the third light-blocking part 210, the first light-blocking part 6, and the second light-blocking part 7 are provided. The low-concentration drain region 231*d* is surrounded by the third light-blocking part 210, the first light-blocking part 6, and the second light-blocking part 7. Therefore, the third light-blocking part 210, the first light-blocking part 6, and the second light-blocking part 7 can particularly effectively suppress incidence of light on the low-concentration drain region 231*d* from all directions. For example, the third light-blocking part 210 suppresses incidence of light on the low-concentration drain region 231*d* in the Z1 direction. Incidence of light in the direction along the XY plane on the low-concentration drain region 231*d* is suppressed by the first portion 61 of the first light-blocking part 6 and the second light-blocking part 7. Incidence of light from the Z2 direction is suppressed by the second portion 62 and the third portion 63 of the first light-blocking part 6.

Further, the second light-blocking part 7 is farther from the low-concentration drain region 231*d* than the first light-blocking part 6 in the X1 direction which is the third direction intersecting the first direction and the second direction. Specifically, the fourth portion 71 of the second light-blocking part 7 is located outside the first light-blocking part 6 in the X-axis. As illustrated in FIG. 9, the fourth portion 71 of the second light-blocking part 7 is separated from the low-concentration drain region 231*d* by a distance D1 in the X1 direction. On the other hand, the first light-blocking part 6 overlaps the low-concentration drain region 231*d* in plan view. Therefore, the first light-blocking part 6 includes a portion at a position in the X1 direction that is equal to a position of the low-concentration drain region 231*d* in the X1 direction. As described above, the fourth portion 71 of the second light-blocking part 7 is located outside the first light-blocking part 6 in the X-axis, so that influence of the gate potential described above on the low-concentration drain region 231*d* can be suppressed as compared with a case where the fourth portion 71 of the second light-blocking part 7 is located inside the first light-blocking part 6 in the X-axis. Thus, an increase in off-leak current can be suppressed.

As illustrated in FIG. 13, the second light-blocking part 7 is coupled to the gate electrode 232. Therefore, the second light-blocking part 7 can be used as a contact for coupling the scanning line 241 and the gate electrode 232. Therefore, it is not necessary to separately form the second light-blocking part 7. In addition, since the second light-blocking part 7 is coupled to the third light-blocking part 210, the third light-blocking part 210 can be used as a back gate. In addition, since the second light-blocking part 7 is coupled to the third light-blocking part 210, it is possible to suppress incidence of light in the Y2 direction on the low-concentration drain region 231*d* by the second light-blocking part 7.

Examples of each material of the first light-blocking part 6 and the second light-blocking part 7 include metal such as tungsten (W), titanium (Ti), chromium (Cr), iron (Fe) and aluminum (Al), metal nitride and metal silicide, and the like. Among them, the first light-blocking part 6 and the second light-blocking part 7 may contain tungsten. Among various metals, tungsten is excellent in heat resistance, and its optical density (OD) value does not decrease easily through heat treatment during manufacturing, for example. Thus, with the light-blocking part 6 and the second light-blocking part 7 containing tungsten, incidence of light on the semiconductor layer 231 can be especially effectively prevented by the first light-blocking part 6 and the second light-blocking part 7. In addition, the first light-blocking part 6 and the second light-blocking part 7 may be identical to or different from each other.

Additionally, as illustrated in FIG. 8, the first light-blocking part 6 is disposed at a through-hole formed at the insulating layer 223. The through-hole includes a first recess R1, a second recess R2, and a third recess R3. The second recess R2 is formed at a bottom of the third recess R3. The first recess R1 is formed at a bottom of the second recess R2. For example, the first light-blocking part 6 is formed as follows.

Figure 14:
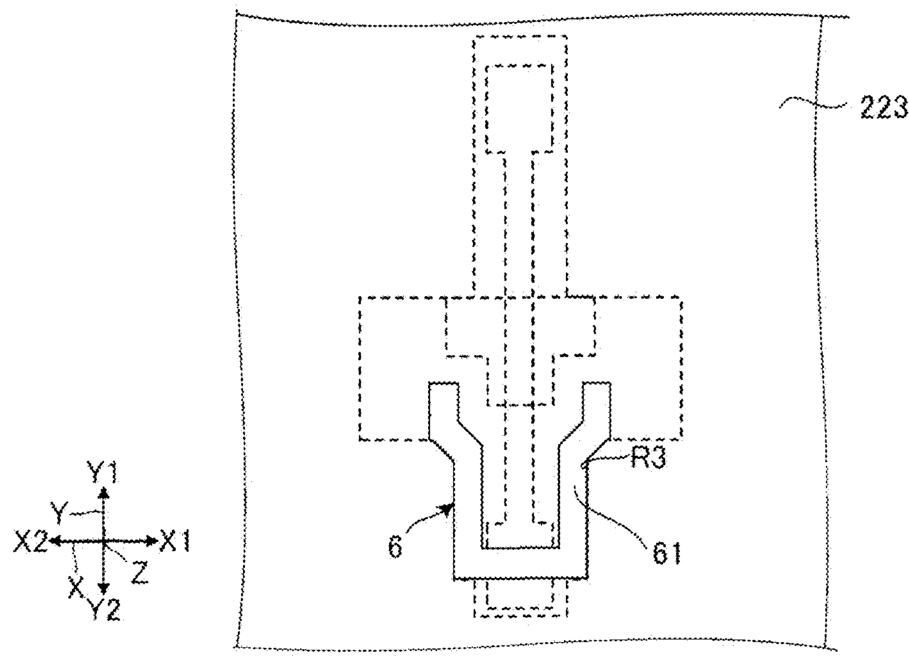
FIG. 14 is a diagram illustrating a manufacturing process of the first light-blocking part.
Figure 15:
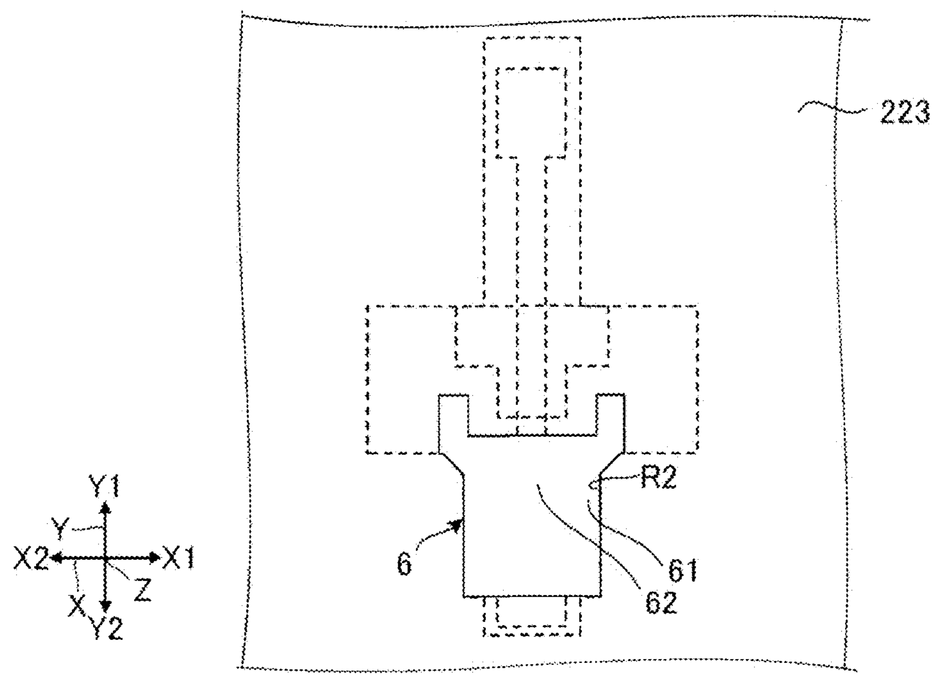
FIG. 15 is a diagram illustrating a manufacturing process of the first light-blocking part.
Figure 16:
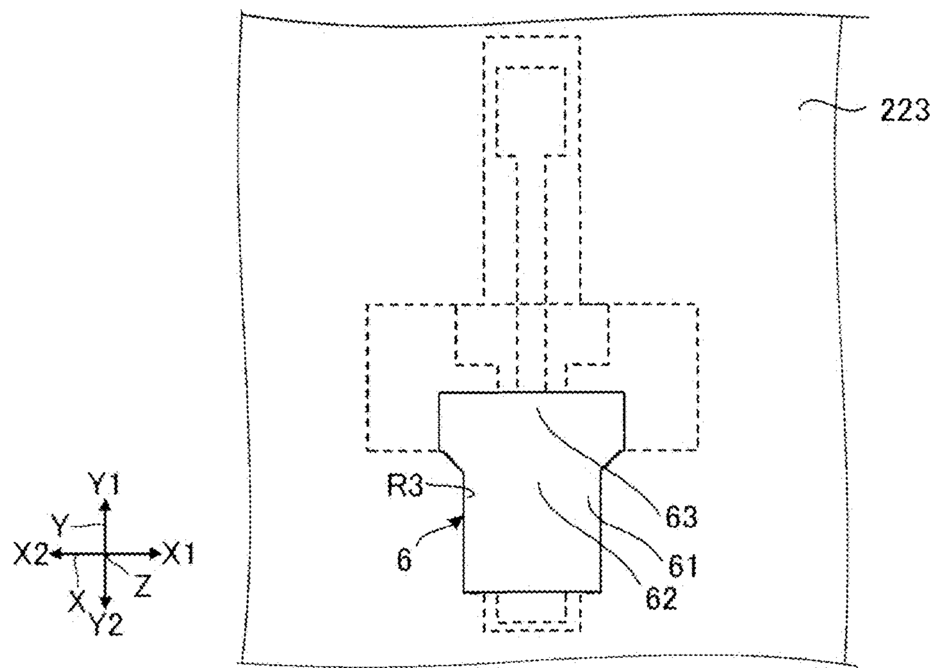
FIG. 16 is a diagram illustrating a manufacturing process of the first light-blocking part.

FIG. 14, FIG. 15, and FIG. 16 are each a diagram illustrating a manufacturing process of the first light-blocking part 6. In FIG. 14 to FIG. 16, illustration of the second light-blocking part 7 is omitted. As illustrated in FIG. 14, first, a part of the first portion 61 is disposed in the first recess R1. Next, as illustrated in FIG. 15, a part of a remainder of the first portion 61 and a part of the second portion 62 are formed in the second recess R2. Thereafter, as illustrated in FIG. 16, the remainder of the first portion 61, a remainder of the second portion 62, and the third portion 63 are formed in the third recess R3. Note that the method of manufacturing the first light-blocking part 6 is not limited to the above-described method and may be any method.

2. Modification Examples

The embodiments illustrated above may be modified in various ways. Specific modifications that can be applied to the above-described embodiments are illustrated below. Two or more aspects arbitrarily selected from examples below may be combined appropriately as long as contradiction is not caused.

In each of the embodiments described above, the electro-optical device 100 using an active matrix scheme is illustrated, but the present embodiment is not limited thereto and a drive scheme for the electro-optical device 100 may be, for example, a passive matrix scheme.

The drive scheme of the "electro-optical device" is not limited to a vertical electric field scheme, but may be a transverse electric field scheme. An example of the transverse electric field scheme may include an In Plane Switching (IPS) mode. Further, examples of the vertical electric field scheme may include a Twisted Nematic (TN) mode, a Vertical Alignment (VA) mode, a PVA mode, and an Optically Compensated Bend (OCB) mode.

In the above description, the second light-blocking part 7 is coupled to the third light-blocking part 210, but need not be coupled. Further, the second light-blocking part 7 may be omitted.

2. Electronic Device

The electro-optical device 100 can be used in various electronic devices.

Figure 17:
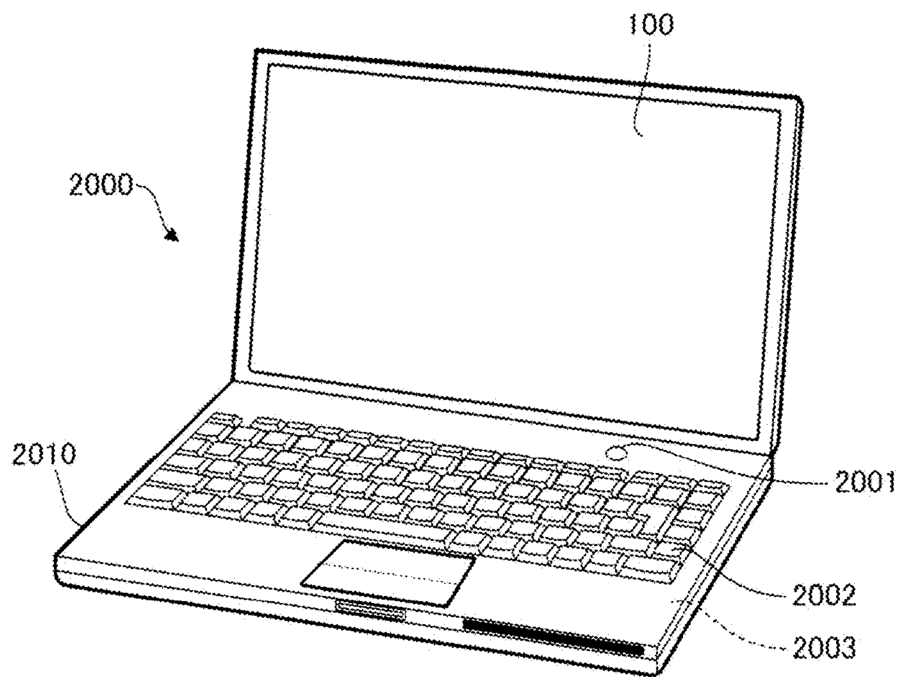
FIG. 17 is a perspective view illustrating a personal computer, which is an example of an electronic device.

FIG. 17 is a perspective view illustrating a personal computer 2000, which is an example of the electronic devices. The personal computer 2000 includes the electro-optical device 100 that displays various images, a body unit 2010 in which a power switch 2001 and a keyboard 2002 are installed, and a control unit 2003. The control unit 2003 includes, for example, a processor and a memory, and controls operation of the electro-optical device 100.

Figure 18:
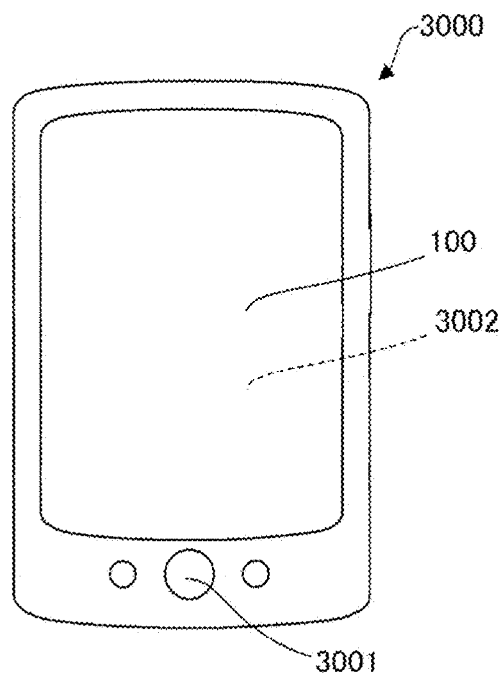
FIG. 18 is a plan view illustrating a smartphone, which is an example of the electronic device.

FIG. 18 is a plan view illustrating a smartphone 3000, which is an example of the electronic devices. The smartphone 3000 includes an operation button 3001, the electro-optical device 100 that displays various images, and a control unit 3002. Screen contents displayed on the electro-optical device 100 are changed according to an operation of the operation button 3001. The control unit 3002 includes, for example, a processor and a memory, and controls operation of the electro-optical device 100.

Figure 19:
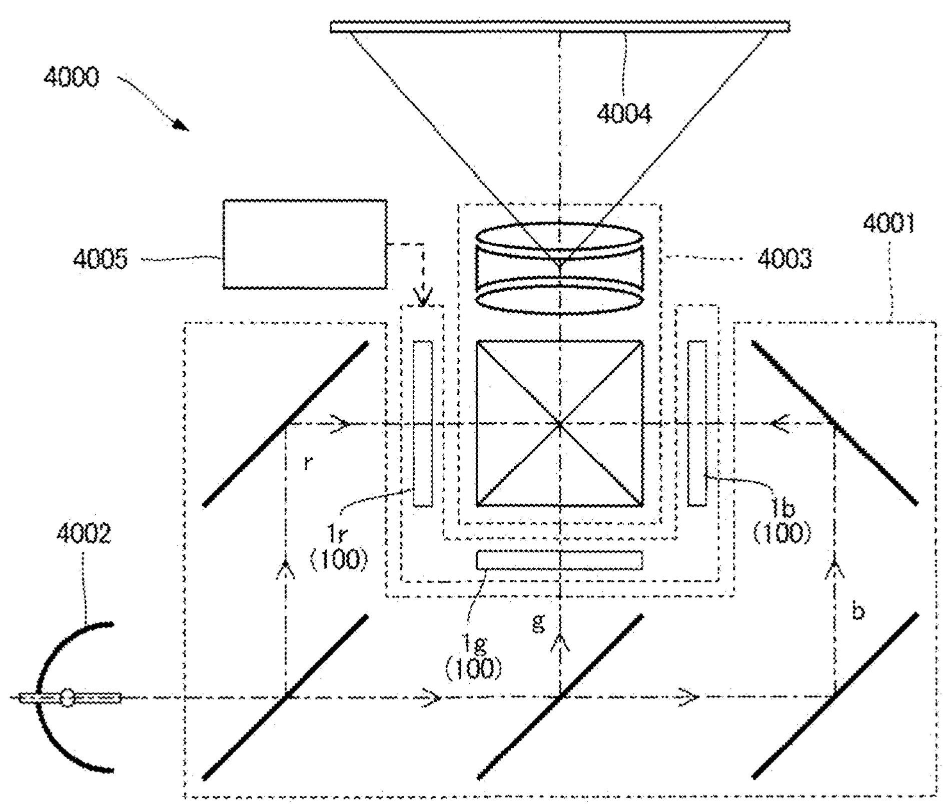
FIG. 19 is a schematic diagram illustrating a projector, which is an example of the electronic device.

FIG. 19 is a schematic diagram illustrating a projector that is an example of the electronic devices. A projection type display apparatus 4000 is, for example, a three-panel projector. An electro-optical device 1*r* is the electro-optical device 100 corresponding to a red display color, an electro-optical device 1*g* is the electro-optical device 100 corresponding to a green display color, and an electro-optical device 1*b* is the electro-optical device 100 corresponding to a blue display color. That is, the projection type display apparatus 4000 includes the three electro-optical devices 1*r*, 1*g*, and 1*b* corresponding to the respective red, green, and blue display colors. A control unit 4005 includes, for example, a processor and a memory, and controls operation of the electro-optical device 100.

An illumination optical system 4001 supplies a red component r of light emitted from an illumination apparatus 4002, which is a light source, to the electro-optical device 1*r*, a green component g to the electro-optical device 1*g*, and a blue component b to the electro-optical device 1*b*. Each of the electro-optical devices 1*r*, 1*g*, and 1*b* functions as an optical modulator such as a light valve that modulates each monochromatic light beam supplied from the illumination optical system 4001 according to a displayed image. A projection optical system 4003 combines light emitted from the respective electro-optical devices 1*r*, 1*g*, and 1*b* and projects the combined light onto a projection surface 4004.

The electronic device described above includes the electro-optical device 100 described above and the control unit 2003, 3002, or 4005. The above-described electro-optical device 100 has an excellent light-blocking property because of the first light-blocking part 6 of the semiconductor layer 231, and thus the destabilization of the operation of the transistor 23 is suppressed. In this manner, the risk of the occurrence of display defects is suppressed. Thus, with the electro-optical device 100, display quality of the personal computer 2000, the smartphone 3000, or the projection-type display device 4000 can be increased.

Note that an electronic device to which the electro-optical device of the present disclosure is applied is not limited to the illustrated device, and examples thereof may include a personal digital assistant (PDA), a digital still camera, a television, a video camera, a car navigation apparatus, an in-vehicle display, an electronic notebook, an electronic paper, a calculator, a word processor, a workstation, a videophone, and a point of sale (POS) terminal. Further, examples of the electronic device to which the present disclosure is applied may include a printer, a scanner, a copier, a video player, and a device including a touch panel.

Although the present disclosure has been described above based on the preferred embodiments, the present disclosure is not limited to the above-described embodiments. Further, a configuration of the respective portions of the present disclosure can be replaced with any configuration that performs the same function as that in the embodiment described above, or any configuration can be added.

Further, in the above description, the liquid crystal display device has been described as an example of the electro-optical device of the present disclosure, but the electro-optical device of the present disclosure is not limited thereto. For example, the electro-optical device of the present disclosure can be applied to an image sensor, or the like.

What is claimed is:

1. An electro-optical device, comprising:
- a substrate;
- a transistor including a semiconductor layer including a drain region, a source region, and a channel region located between the drain region and the source region, and extending in a first direction, and a gate electrode;
- a scanning line electrically coupled to the gate electrode; and
- a first light-blocking part, wherein
- the substrate, the semiconductor layer, the gate electrode, and a layer at which the scanning line is provided are arranged in a second direction intersecting the first direction,
- the first light-blocking part includes a first portion, a second portion, and a third portion,
- the first portion is provided between the substrate and the layer at which the scanning line is provided,
- the second portion is provided between the semiconductor layer and the layer at which the scanning line is provided,
- the third portion is provided between the gate electrode and the layer at which the scanning line is provided, and
- a length of the first portion in the second direction, a length of the second portion in the second direction, and a length of the third portion in the second direction are longer in this order.

2. The electro-optical device according to claim 1, wherein
- the semiconductor layer further includes a low-concentration drain region located between the drain region and the channel region in plan view, and
- the second portion overlaps the low-concentration drain region in plan view.

3. The electro-optical device according to claim 1, wherein
- the second portion is closer to the semiconductor layer than the third portion in the second direction.

4. The electro-optical device according to claim 1, wherein
- the first portion is coupled to the drain region.

5. The electro-optical device according to claim 1, wherein
- the third portion overlaps the gate electrode in plan view.

6. The electro-optical device according to claim 2 further comprising a second light-blocking part separated from the first light-blocking part, wherein
- the second light-blocking part and the first light-blocking part surround the low-concentration drain region in plan view.

7. The electro-optical device according to claim 1 further comprising a second light-blocking part separated from the first light-blocking part, wherein
- the second light-blocking part is coupled to the gate electrode.

8. The electro-optical device according to claim 2 further comprising a second light-blocking part separated from the first light-blocking part, wherein the second light-blocking part is farther from the low-concentration drain region than the first light-blocking part in a third direction intersecting the first direction and the second direction.

9. The electro-optical device according to claim 2 further comprising a second light-blocking part separated from the first light-blocking part, wherein the second light-blocking part includes two fourth portions including a portion extending in the first direction, and separated from each other, and a fifth portion located between the two fourth portions in plan view, and extending in a third direction intersecting the first direction and the second direction.

10. An electronic device comprising:

the electro-optical device according to claim 1; and a control unit configured to control operation of the electro-optical device.

* * * * *